(12) United States Patent
El Saddik et al.

(10) Patent No.: US 8,294,557 B1
(45) Date of Patent: Oct. 23, 2012

(54) SYNCHRONOUS INTERPERSONAL HAPTIC COMMUNICATION SYSTEM

(75) Inventors: Abdulmotaleb El Saddik, Ottawa (CA); Jongeun Cha, Ottawa (CA); Mohamad Ahmad Eid, Ottawa (CA); Fawaz Abdulaziz A Alsulaiman, Ottawa (CA); Atif Mohammad Alamri, Ottawa (CA); Lara Rahal, Ottawa (CA); Daniel J. Martin, Greely (CA)

(73) Assignee: University of Ottawa, Ottawa, Ontario (CA)

( * ) Notice: Subject to any disclaimer, the term of this patent is extended or adjusted under 35 U.S.C. 154(b) by 632 days.

(21) Appl. No.: 12/481,274

(22) Filed: Jun. 9, 2009

(51) Int. Cl.
*H04B 3/36* (2006.01)

(52) U.S. Cl. .............. 340/407.1; 340/407.2; 340/7.6; 340/7.61; 340/815.4; 345/173; 345/178

(58) Field of Classification Search .......... 340/407.1, 340/407.2, 7.6, 7.61, 815.4, 425.5, 691.6; 345/156, 158, 173, 178
See application file for complete search history.

(56) References Cited

U.S. PATENT DOCUMENTS

| 6,337,681 | B1 * | 1/2002 | Martin | 345/178 |
| 7,973,773 | B2 * | 7/2011 | Pryor | 345/173 |
| 2008/0122797 | A1 * | 5/2008 | Soh et al. | 345/173 |

* cited by examiner

*Primary Examiner* — Hung T. Nguyen
(74) *Attorney, Agent, or Firm* — Garvey, Smith, Nehrbass & North, L.L.C.; Brett A. North

(57) ABSTRACT

A method, apparatus and system of synchronous haptic communications between an active user and a passive user through a network is provided. An image from an imaging device is captured of the passive user. Geometry or position data is determined from the captured image by utilizing a depth component of the capture image. Haptic feedback is generated to a haptic interface used by the active user based upon the determined geometry or position data. Haptic data is captured from the haptic interface used by the active user and tactile output is generated to a tactile display associated with the passive user wherein the tactile output is based upon the haptic data in correlation with the geometry or position data to determine collisions therein.

20 Claims, 16 Drawing Sheets

(a) Natural touch (b) Simulated touch through Inter-taction system

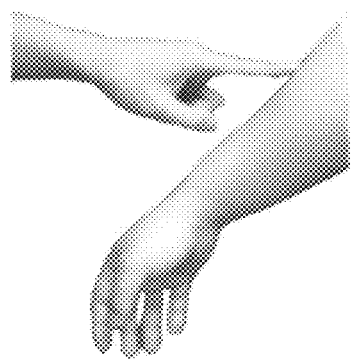
(a) Natural touch
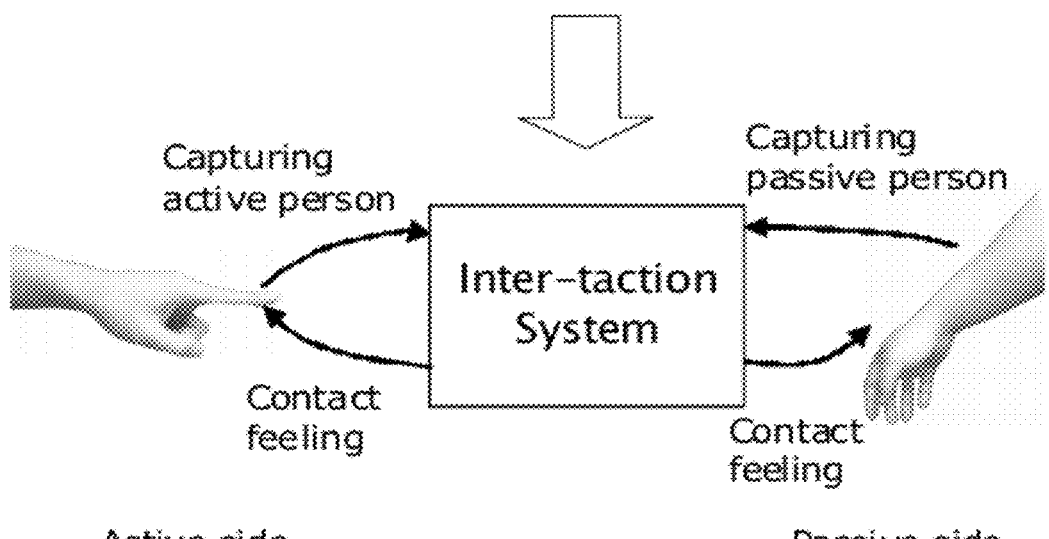
(b) Simulated touch through Inter-taction system
*FIG. 1*

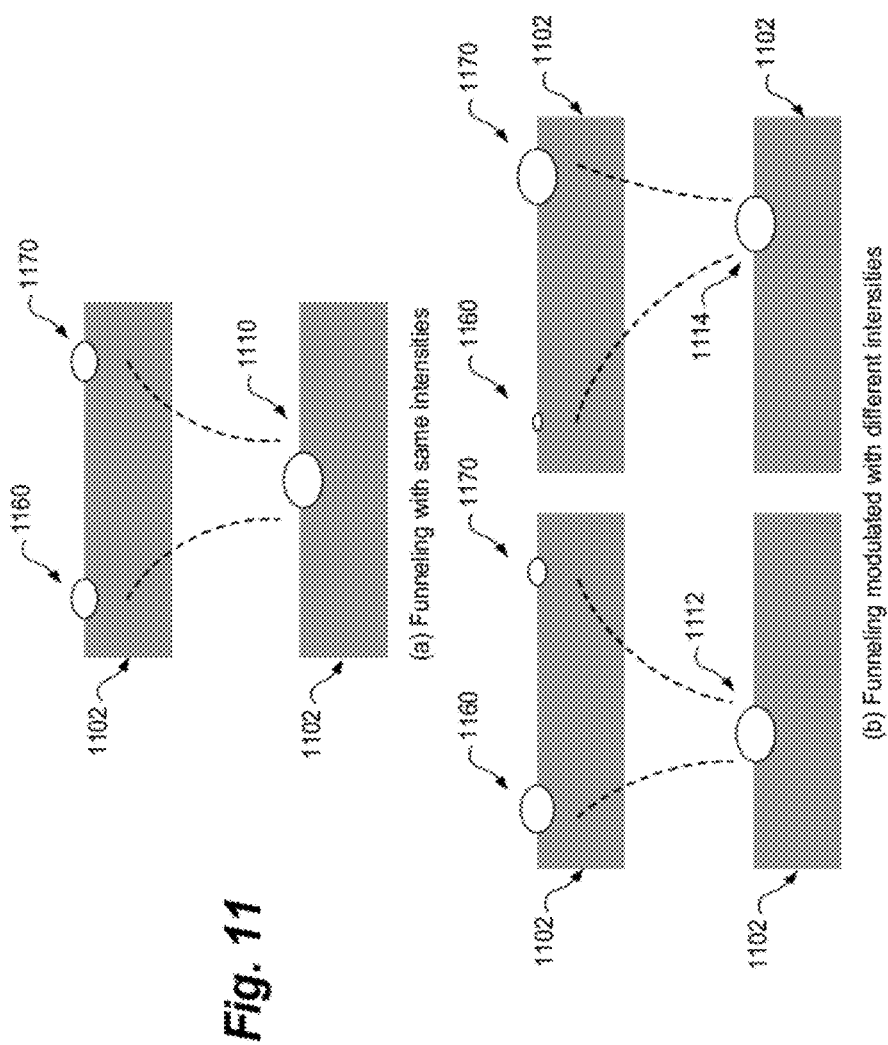

SYNCHRONOUS INTERPERSONAL HAPTIC COMMUNICATION SYSTEM

TECHNICAL FIELD

The present disclosure relates to haptics and in particular to a haptic communication system.

BACKGROUND

Traditionally, graphic images, audio, video, text and animations define the contents of a multimedia system. Recently, there has been significant progress in advanced multimedia systems incorporating virtual reality and haptics (or the sense of touch) into the human computer interaction paradigm. Haptics, a term that was derived from the Greek verb "haptesthai" meaning "to touch", refers to the science of sensing and manipulation through touch. A haptic interface is a device which allows a user to interact with a computer by receiving tactile feedback.

The basic principle behind haptic interaction is simple: the user uses the handler of the haptic device to explore the virtual environment. At every time interval—say 1 millisecond—the computer checks for collisions between the simulated stylus and the virtual objects populating the virtual environment. If a collision occurs, the haptic rendering system computes the reaction forces and commands the actuators of the haptic device, thus leading to a tactual perception of the virtual objects. If no collision is detected, no forces will be applied and the user is free to move the stylus as if exploring the free space.

Haptics plays a prominent role in making virtual objects physically palpable in virtual and mixed reality environments. The incorporation of the sense of touch in multimedia applications gives rise to far more exciting and appealing ways of supporting collaboration, co-presence, and togetherness in multimedia systems by enabling users to feel each other's presence and the environments in which they are interacting. For instance, haptics is crucial for interpersonal communication as a means to express affection, intention or emotion; such as a handshake, a hug or physical contact.

One of the major challenges in haptic research is the communication of haptic data over a network, or what is usually referred to as tele-haptics. Tele-haptics pose new requirements and challenges at both the application level and the transport (networking) level. The haptic interaction requires simultaneous and interactive input and output by the haptic device with extremely high update rate (up to 1 kHz). At the application level, haptic interaction stability and transparency are the major concerns; especially stability since the device is applying physical forces that might hurt the users. At the networking level, quality of service parameters such as the network latency, jitter, and packet loss are key aspects.

Accordingly, systems and methods that enable synchronous interpersonal haptic communication through a network remain highly desirable.

SUMMARY

In accordance with the present disclosure there is provided a method of synchronous haptic communications between an active user and a passive user through a network. The method comprises capturing an image from an imaging device of the passive user and determining geometry or position data from the captured image by utilizing a depth component of the captured image. Capturing haptic data from a haptic interface used by the active user based upon interaction with a generated image based on the captured image. Generating tactile output to a tactile display associated with the passive user wherein the tactile output is based upon the haptic data in correlation with the geometry or position data to determine collisions therein. Generating haptic feedback to the haptic interface used by the active user based upon the haptic data in correlation with the geometry or position data to determine collisions therein.

In accordance with the present disclosure there is provided an apparatus for synchronous haptic communications through a network. The apparatus comprises a processor and a memory containing instructions for execution by the processor. The instructions comprising capturing an image from an imaging device of the passive user and determining geometry or position data from the captured image by utilizing a depth component of the captured image. Capturing haptic data from a haptic interface used by the active user based upon interaction with a generated image based on the captured image. Generating tactile output to a tactile display associated with the passive user wherein the tactile output is based upon the haptic data in correlation with the geometry or position data to determine collisions therein; and generating haptic feedback to the haptic interface used by the active user based upon the haptic data in correlation with the geometry or position data to determine collisions therein.

In accordance with the present disclosure there is provided a system for synchronous haptic communications between an active user and a passive user through a network. The system comprising an image coding module for capturing images of the passive user and for generating a depth image to generate geometry or position data of the passive user. At least one network manager for facilitating networking and communication between the active user and passive user devices. A haptic render for converting a haptic position input and generating haptic feedback based on a haptic input device for receiving position input from the active user and providing haptic feedback to the active user. A tactile render for providing control commands to a tactile display for providing tactile output to the passive user based upon received contact data from the network manager. A video render for rendering an image or representation of the passive user to an video display to the active user. A virtual space manager for processing geometry or position data of the passive user with haptic position input of the active user to generate the contact data, and provide the contact data to the tactile render and to the haptic render to simulate touch between the active user and passive user.

BRIEF DESCRIPTION OF THE DRAWINGS

Further features and advantages of the present invention will become apparent from the following detailed description, taken in combination with the appended drawings, in which:

FIG. 1a and 1b show a representation of simulated touch;

FIGS. 11a and 11b show a representation of a funneling illusion for providing tactile output;

It will be noted that throughout the appended drawings, like features are identified by like reference numerals.

DETAILED DESCRIPTION

Embodiments are described below, by way of example only, with reference to FIGS. 1-14.

The present disclosure defines a haptic tele-conferencing or interactive communication system enabling 'tele-taction' between participants that transmits haptic data at 60 Hz rate using image-bases representation method for the haptic information. Furthermore, the disclosure enables direct and natural touch of video contents where users can feel continuous touch such as stroke touch.

The disclosed system can be utilized for video based interactions such as provided in videoconferencing or teleconferencing applications. In addition the disclosure is applicable to gaming system that would allow users to interact by providing an additional sense perception. In addition it may be applied to interactive therapy system and social networking applications.

The system enables two (or more) remotely located users to see and hear as well as touch each other. Since users are located in physically different places, they need to be captured and located in a common virtual space where their interaction is computed. If there is a contact between the captured users, the contact information such as contact position and intensity is transferred and displayed to each user. FIG. 1 shows a schematic diagram of the inter-taction system in the case of two participants. In natural touch interaction, as shown in FIG. 1(a) communication is direct and instantaneous. When user interaction occurs through a network, simulated interaction between users is facilitated by capturing active person movements and providing contact to the passive participant, as shown in FIG. 1(b), to simulate natural touch interaction.

Figure 2:
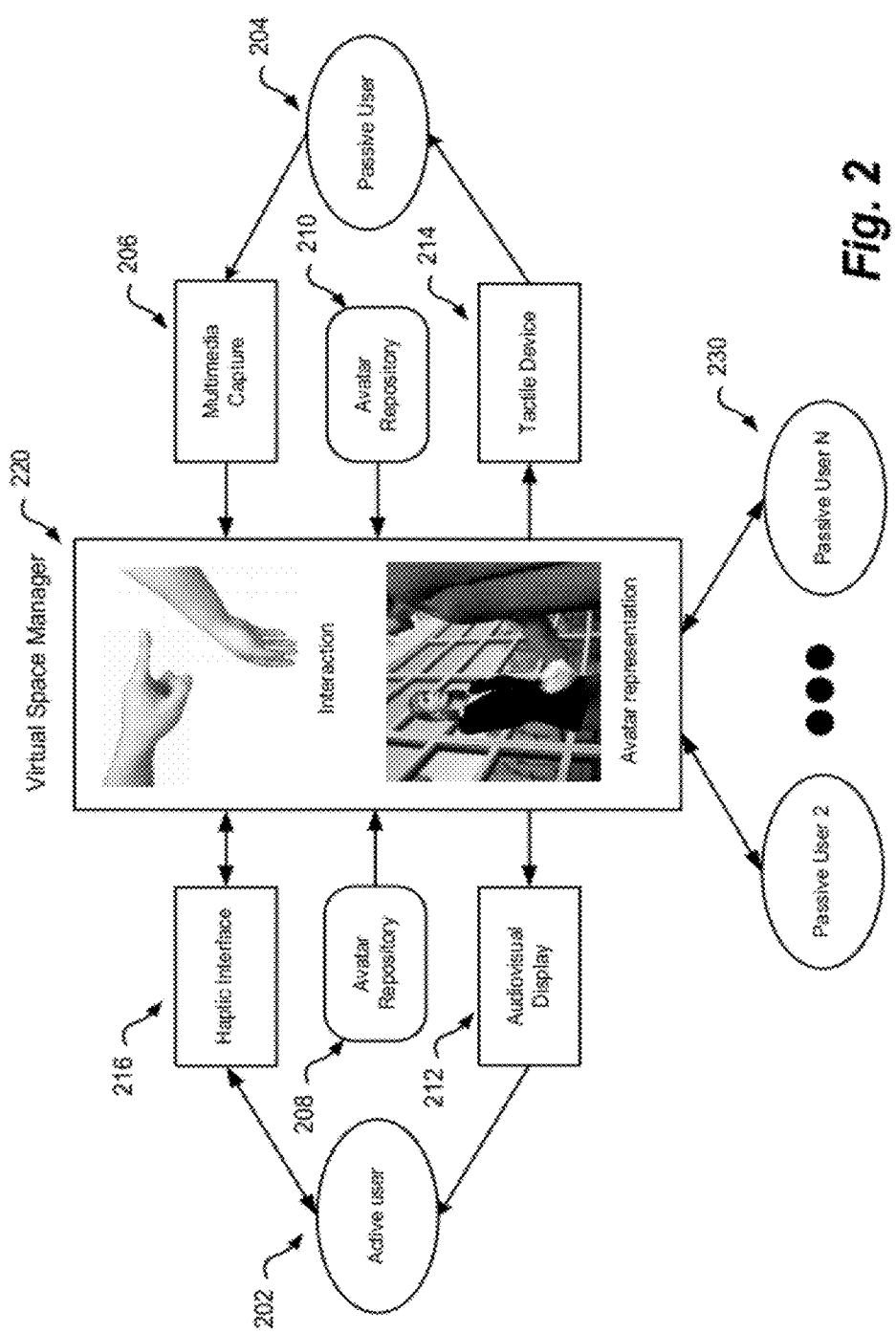
FIG. 2 shows representation of an inter-taction system.

FIG. 2 shows a representation of the inter-taction system. The inter-taction system enables interaction through a virtual space manager 220 to facilitate contact between an active user 202 and a passive user 204. The manager represents the system and software residing on one or more computers or processors for facilitating the inter-taction system. The manager interfaces with a visual (video) capture module 206 for processing received images, avatar repositories 208 and 210 for generating representations of users (if utilized), audiovisual display 212 for presenting images or avatars to an active user, haptic interface 216 receives haptic input from the active user and provides haptic feedback to the active user, tactile display 218 for providing haptic input to the passive user, and the virtual space manager 220 to facilitate communication between devices. The active user uses a haptic device or interface to remotely touch the passive user, who in turn can feel the touch of the active user. The visual capture module captures the users' 3D or 2.5D geometry of the touched participant providing a depth component to a 2D image. The captured passive users' geometries are stored in the virtual space manager. They can also be represented by respective avatars that are controlled by the captured passive users' position information. The haptic interface captures the position of the active user's part or whole body that will be used to touch the passive users. The active user's avatar is located in the virtual space and is controlled by the position information captured by the haptic interface. This virtual space, such as in a gaming environment, is displayed to the active user using the video display module. If there is any contact among passive users' captured geometries or avatars and the active user's avatar in the virtual space, the contact forces and tactile sensations are displayed to the active user through the haptic interface whereas the tactile feedback sensation is displayed to the passive users using the tactile display such as tactile device. The inter-taction system can be arranged for multiple active/passive participants 230 based upon the application. Although the system shows separate active and passive users components they can be applied to bi-direction communication between participants, where each user has active and passive interactions simultaneously.

Figure 3A:
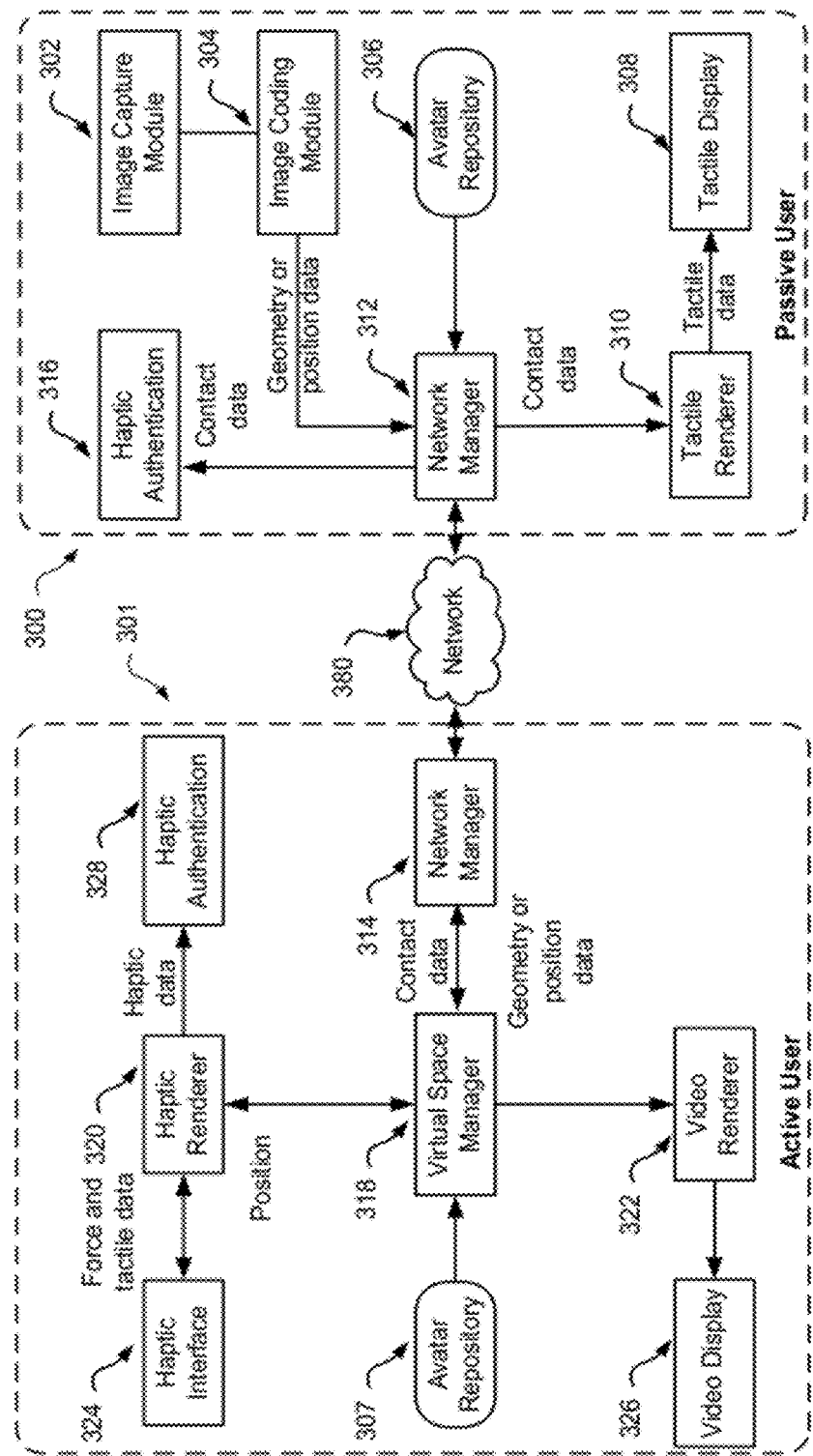
FIGS. 3a and 3b show system diagrams of a virtual space manager.

FIG. 3a shows a system diagram of the virtual space manager providing interactions between components of the systems where the virtual space manager and associated functions are executed on one of the user devices. The virtual space manager integrates and manages modules on the passive side 300 and active side 301 to facilitate communication through a network 380. The network may comprise any kind of data IP based network, wired or wireless capable of supporting real-time audio, video or data applications. On the passive side 300, an image capture module 302 captures different multi-modal information, including haptic, audio, and visual, among others, provided by input devices such as video cameras, web-cameras or other imaging means and converts into a format readable by the computer system. The visual component also includes position information such as object tracking provided by 2.5D and 3D camera systems. Image coding module 304 encodes the captured multi-modal information into a format that increases the efficiency of transmission over a network. In a virtual reality environment, if captured video is not required, only multi-modal information needs to be transmitted such as position or geometry data. Alternatively, the geometry or position data may be encoded in an MPEG-4 transport stream using a depth image-based haptic representation (DIBHR) added to the stream or be sent synchronously through the network with video data independent of the video transport stream. Avatar repository 306 and 307 stores all the 3-Dimensional representation information for the participants and any possible virtual objects in the environment. The repository may be resident on a local machine accessed at each user location or provided through a server coupled to the network. In the case of video conferencing an avatar repository may not be used if a live video stream is utilized. A tactile display 308 is a device composed of an array of actuators that simulate tactile feelings (such as a tactile jacket, vest, glove, suit or furniture incorporating addressable actuators). The tactile device may comprise markers or indicators utilized by the image capture module 302 to aid in identifying physical positions or landmarks for activating actuators in the device. Tactile renderer module 310 instructs the actuators to run in a particular fashion in order to simulate continuous tactile feedback based upon received contact data.

The network managers 312, 314 provide multiplexing/demultiplexing different captured and computed data and encapsulating/de-capsulating and transmitting/receiving the multiplexed data over a network 380. Haptic authentication modules 316, 328 use the haptic information to continuously authenticate the touching party, the user contact data is verified against known user patterns to determine authenticity, as described in FIG. 14.

On the active side 301, virtual space manager 318, maintains the virtual world representing the real captured environment and will be used for rendering interaction forces/visual cues to the participants. The haptic renderer 320 computes the haptic feedback that should be displayed to the active user when interacting with a remote environment. A haptic interface 324 reads and renders haptic interactions between the end user and the virtual space. The video renderer 322 computes the data that should be sent to the video display based on the interactions between participants (active and/or passive users) using received geometry and position data. Video display 326 converts the received signal into a form displayable by the video display.

Figure 3B:
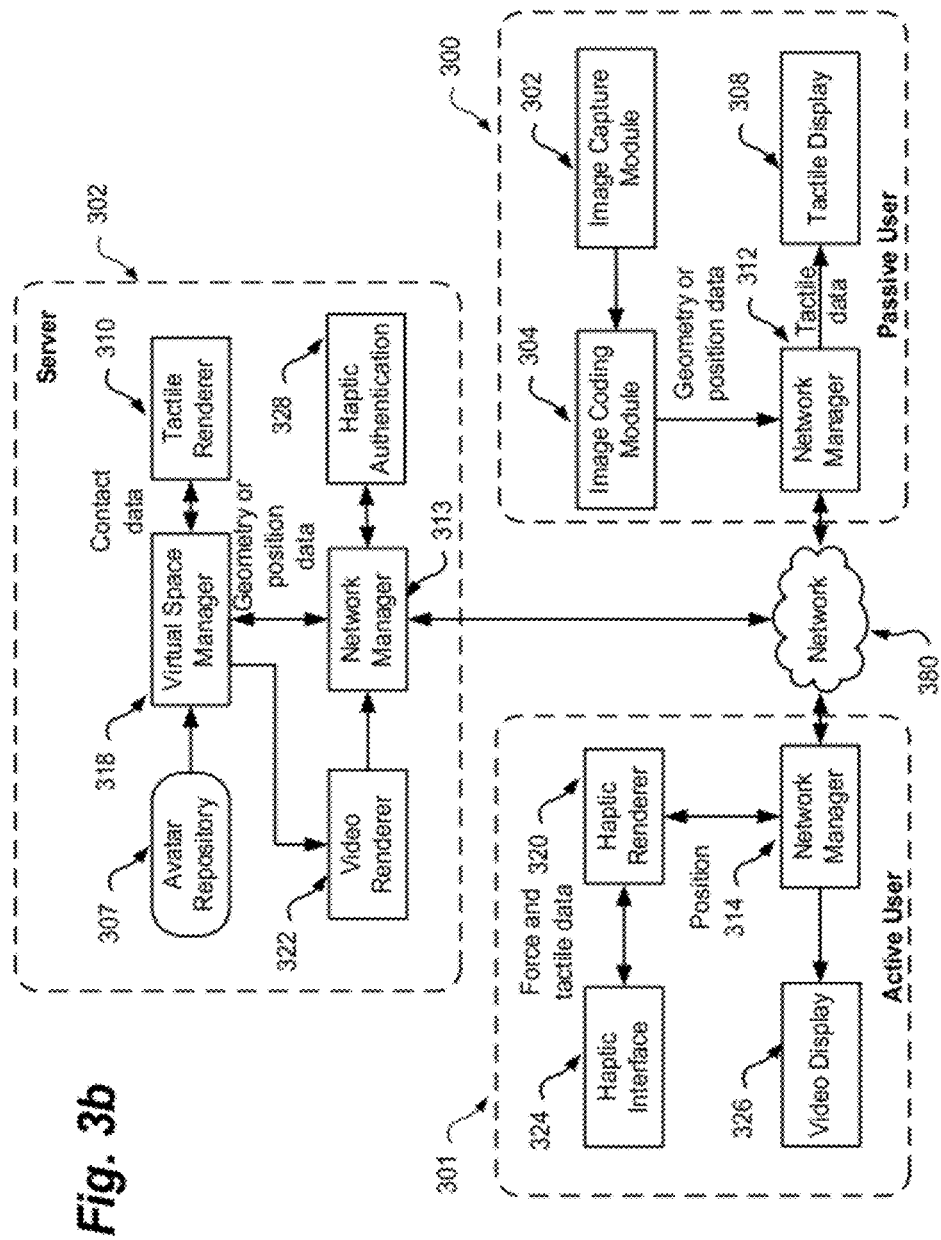

FIG. 3b shows a system diagram where the virtual space manager operates on a server 302. The virtual space manager integrates and manages modules to facilitate interaction between the passive side 300 and active side 301 to facilitate communication through a network 380. The modules that can be off-loaded to the server to reduce computing requirements of the active and passive devices enabling lower computing power devices to be utilized. The network may comprise any kind of data IP based network, wired or wireless capable of supporting real-time audio, video or data applications. In this configuration the server hosts processes that are either computationally intensive or may be required by multiple devices. The avatar repository 307 stores all the 3-Dimensional representation information for the participants and any possible virtual objects in the environment and provides avatar information to the passive and active users as required. The avatar information may be used for presenting character information in gaming applications or virtual reality environments. The network managers 312, 313, 314 provide multiplexing/de-multiplexing of different data and encapsulating/de-capsulating and transmitting/receiving the multiplexed data over a network 380. Haptic authentication module 328 uses the haptic information to continuously authenticate the touching party, the user contact data is verified against known user's pattern to determine authenticity, as described in FIG. 14. The server also includes the virtual space manager 318 to manage interactions and determine if collisions between the active and passive interfaces has occurred, the video renderer 322 converts the process data to a displayable format used by the video display 326, similarly the tactile render 310 generates data to enable tactile feedback based upon received contact data for delivery to the passive user via the tactile display 308. The system enables haptic interaction to be provided to the haptic device over the network. In generating haptic information high update rates (around 1 kHz) are required for stable haptic interaction. This requirement limits applicability to non-dedicated networks, such as the Internet, where the relative network bandwidth is limited. The haptic data in the present system can be sent at a significantly lower rate, 15 to 60 Hz by utilizing the haptic representation method removing any issues that may be caused by potential network throughput. Providing 'tactile feeling' over a network in traditional systems converts artificial information (caller ID, distance, dial tone, busy signal) or touch information captured by pressure sensors into tactile output and send and display it. However, in the present system 'natural' touch interaction is simulated so that active user sees and touches passive users and that touch is displayed to each passive user through tactile device.

Figure 4:
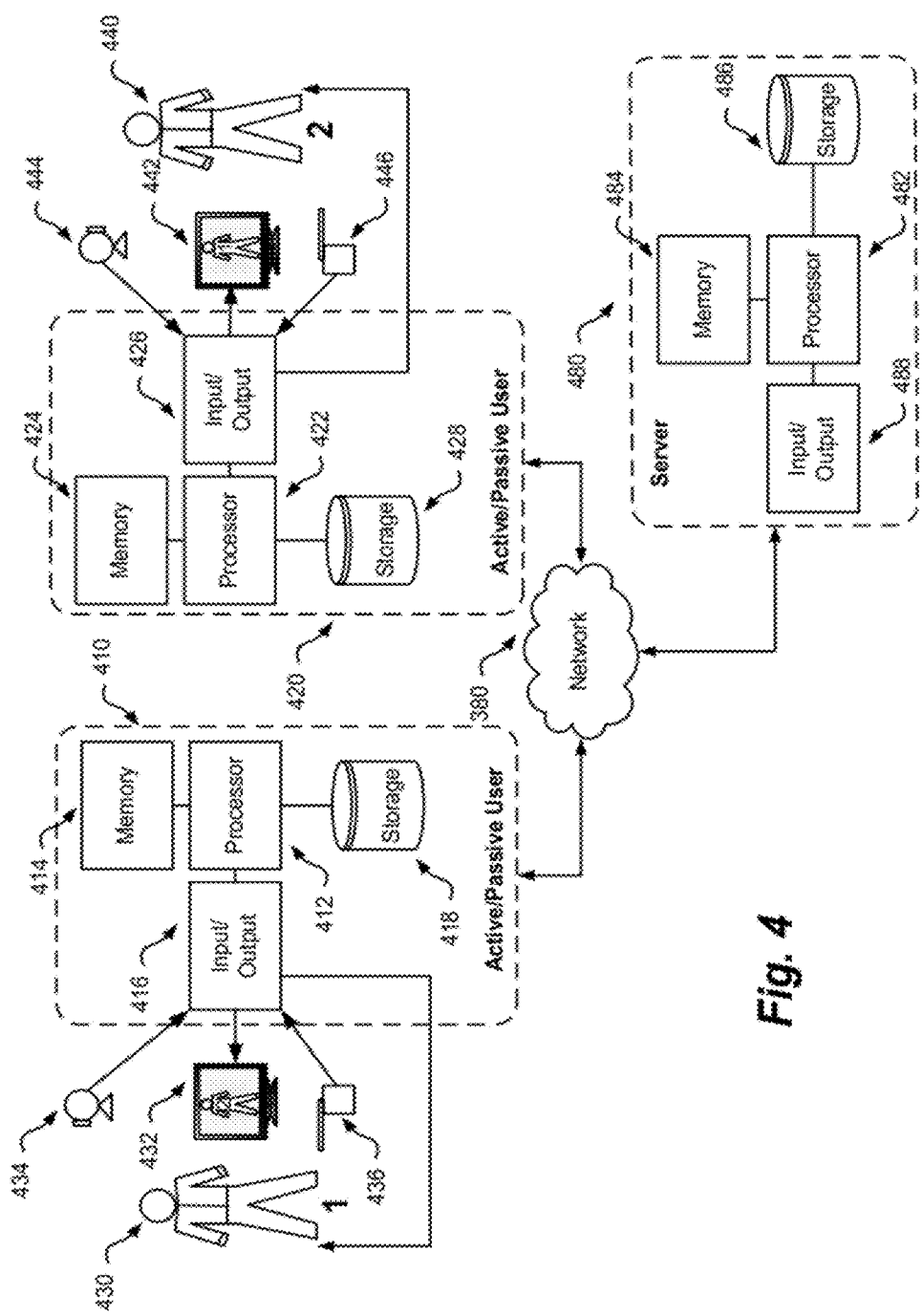
FIG. 4 shows a system diagram of a synchronous interpersonal haptic communication system.

FIG. 4 shows a system diagram of a synchronous interpersonal haptic communication system. The diagram assumes that users will be participating in both active haptic input and receiving passive tactile output. Each user 430 and 440 are equipped with a tactile device such as a jacket, glove, vest or some form of furniture which contains actuators to enable simulation of touch. The tactile device is coupled to a computing device 410, 420 comprising a processor 412, 422, memory 414, 424, input/output interfaces 416, 426, and storage 418, 428. The memory 414, 424 and storage 418, 428 store instructions for facilitating the virtual space manager 318 and the associated component for facilitating the interaction process by execution on processor 412, 422. The input/output interfaces are coupled to a video capture device 434, 444 for receiving video images of the user 430, 440. In addition a display device 432, 442 is provided for showing video of the other user or a representation of the other user or an avatar. A haptic input device 436, 446 enables input from the user to be received to enable interaction with the images displayed on the display device 432, 442. The haptic device 436, 446 may provide haptic feedback to the user to provide sensation of contact with the other user based upon the haptic device utilized. Alternatively, the haptic input device 436, 446 can be replaced by a display device 432, 442 providing tactile capability such as a touch screen. Communication between the computing devices 410, 420 is performed through network 380. The network may also be coupled to a server 480. The server 480 comprises at least a processor 482, memory 484, storage 486 and input/output interface 488 to execute instructions to perform some of the functions described in connection virtual space manager such as determine object collisions, avatar representations, user authentication or synchronization or coordination based upon the system configuration.

Figure 5:
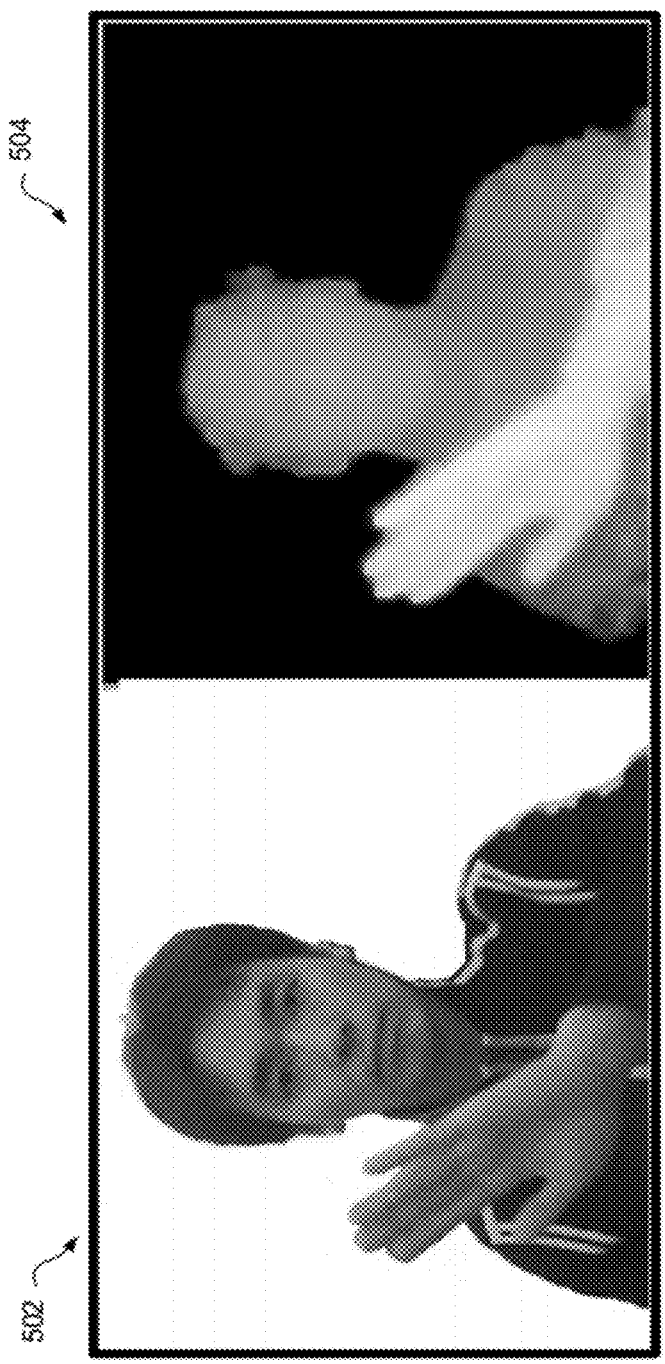
FIG. 5 shows depth image-based representation of a capture image.

FIG. 5 shows a depth image-based representation generated by a video capture device to represent the passive users. The depth image can be generated based on an additional depth data provided by measurement means such as infrared or acoustic technology to determine a position relative to a video capture device. Alternatively depth information may be generated by 3D stereo camera device. The depth image-based representation is a combination of general color images 502 and synchronized gray-scale depth images containing per-pixel depth information. The gray-level of each pixel in the depth image indicates the distance from a camera as shown in 504. The higher (whiter) the level is, the closer the distance to the camera. Since depth-image-based-rendering (DIBR) uses images for modeling a scene, a natural video, that captures a real moving scene as shown 502, can be easily generated using stereo matching algorithms or a depth camera, such as by a ZCam™ by 3DV Systems, while it is very hard to model a real moving scene with polygons or voxels. DIBR is considered a 2.5D representation in the sense that the depth image has incomplete 3D geometrical information describing the scene from the camera view, and thus viewers can touch what they see. This means that the interaction capability is reduced compared to a full 3D scene and thus viewers cannot touch invisible parts of the scene.

Figure 6:
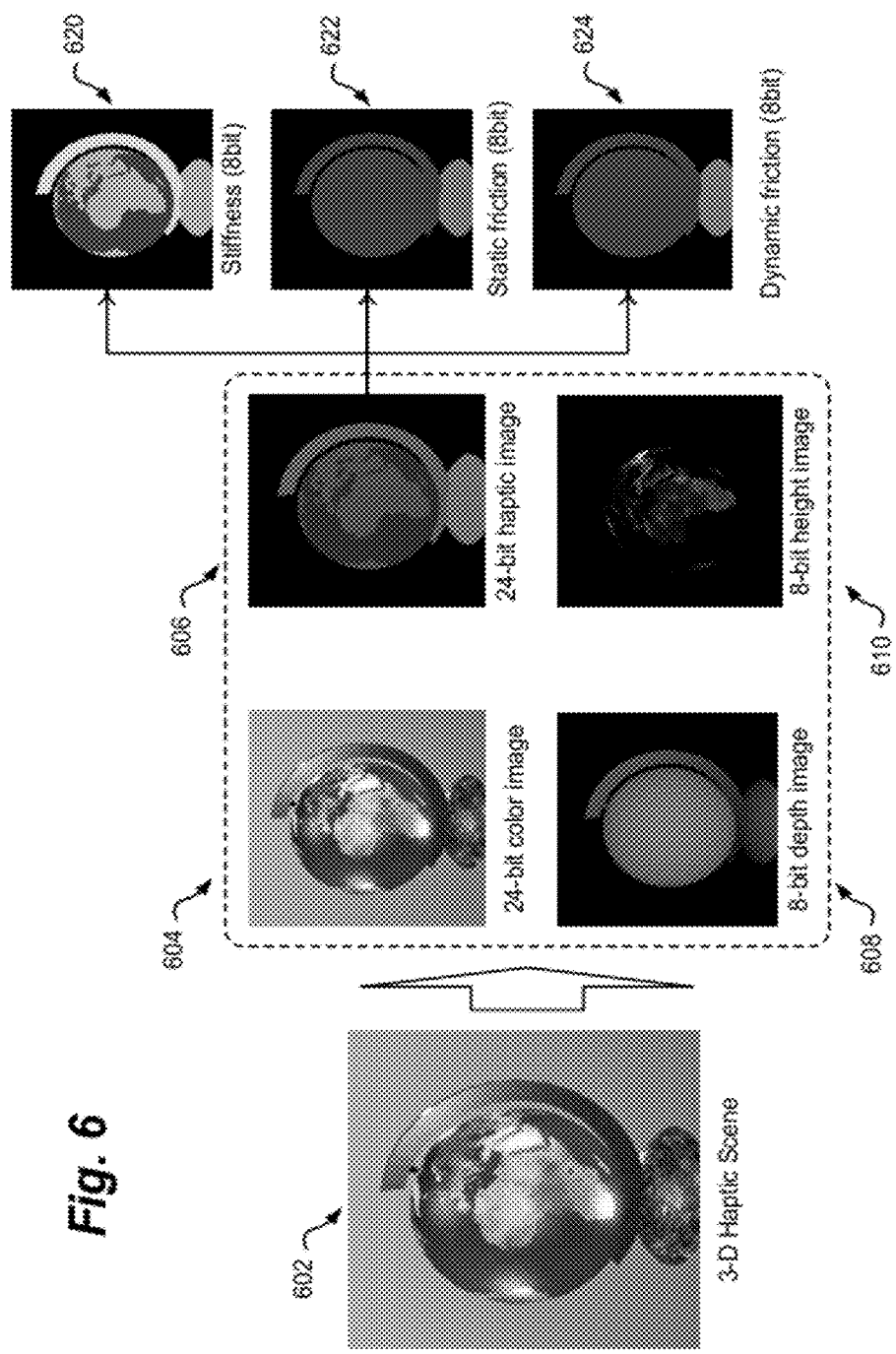
FIG. 6 shows a depth image-based haptic representation.

FIG. 6 presents a depth image-based haptic representation from a captured image 602 generating a 24-bit color image 604 and 24-bit haptic image 606 and 8-bit depth 608 and 8-bit height images 610. In DIBR, a depth image is treated as a single object. So, a haptic surface property is assigned on the whole depth image by using haptic image 606. So, a haptic surface property is assigned on the whole depth image. When the depth image is replaced with depth video to model a dynamically changing scene, the haptic image should be replaced correspondingly with a haptic video. However, if the haptic image represents only one haptic property such as stiffness, friction, or roughness, many haptic images will be needed to represent one haptic scene. This in turn will significantly increase the media size to the extent that it becomes impractical for storage and transmission.

Three 8-bit channels are used to represent stiffness, static friction, and dynamic friction, respectively; in a similar way of using red, green and blue colors in a general RGB image. These three haptic properties are sufficient to express many key haptic experiences and are used in most haptic applications; even though many other haptic properties can be encoded in the same way such as viscosity. These properties can be assigned based upon color information provided in the color image or may have values associated based the avatar model being utilized. In addition, the roughness of the depth image surface is represented with a heightmap that is commonly used in computer graphics and many haptic property representations to express richer and more detailed surface geometry. The pixel values of the heightmap represent fine elevation changes of the surface relative to the original surface that is represented by the depth image. Although the depth image and the heightmap image have a same format of a gray image and stand for a distance toward a camera, range of the depth image is from a far plane to a near plane of the camera and that of the heightmap image is from the depth image surface to a predefined maximum height value. These ranges are stored as meta-data with the images. In other words, the macro geometry shape is represented by the depth image whereas the micro geometry roughness is represented by the heightmap image. By having two different images with two different ranges for geometry representation, the number of bits can be saved while keeping fine roughness representation. Although only three properties are discussed other haptic properties may be used to describe the haptic representation based upon the particular implementation.

Therefore, each frame of a scene is represented using four images: a 24-bit color image, an 8-bit depth image, a 24-bit haptic image, and an 8-bit heightmap image. This is referred as a representation method as Depth Image-Based Haptic Representation (DIBHR). The 24-bit color image contains the three color components (red, green, and blue). The 8-bit depth image describes the global depth variations of various objects in the video contents (based on the camera parameters). The haptic image has three 8-bit channels for stiffness, static friction and dynamic friction, respectively. Finally, the 8-bit heightmap image contains the fine height details for the object surface. By bearing haptic information as images, compatibility is maintained with traditional image representations for video and take advantage of well developed image compression methods. However, the haptic property values are usually expressed with a floating-point variable to express a wide range of surface feelings. With an 8-bit channel, 256 levels of property values can be expressed. In order to overcome this defect, the meta-data can contain two floating-point scalar values that represent minimum and maximum haptic property values for each channel.

As for the heightmap image, since the minimum value over zero means the height elevation of a whole depth image, only the maximum value is set. In addition, in order to reconstruct a 3D scene from the depth image where haptic interaction is occurring, intrinsic camera parameters need to be considered such as the focal length of a camera that captures the depth image, physical pixel width, and the near and far depth clipping planes. These parameters are stored as meta-data as well.

Figure 7:
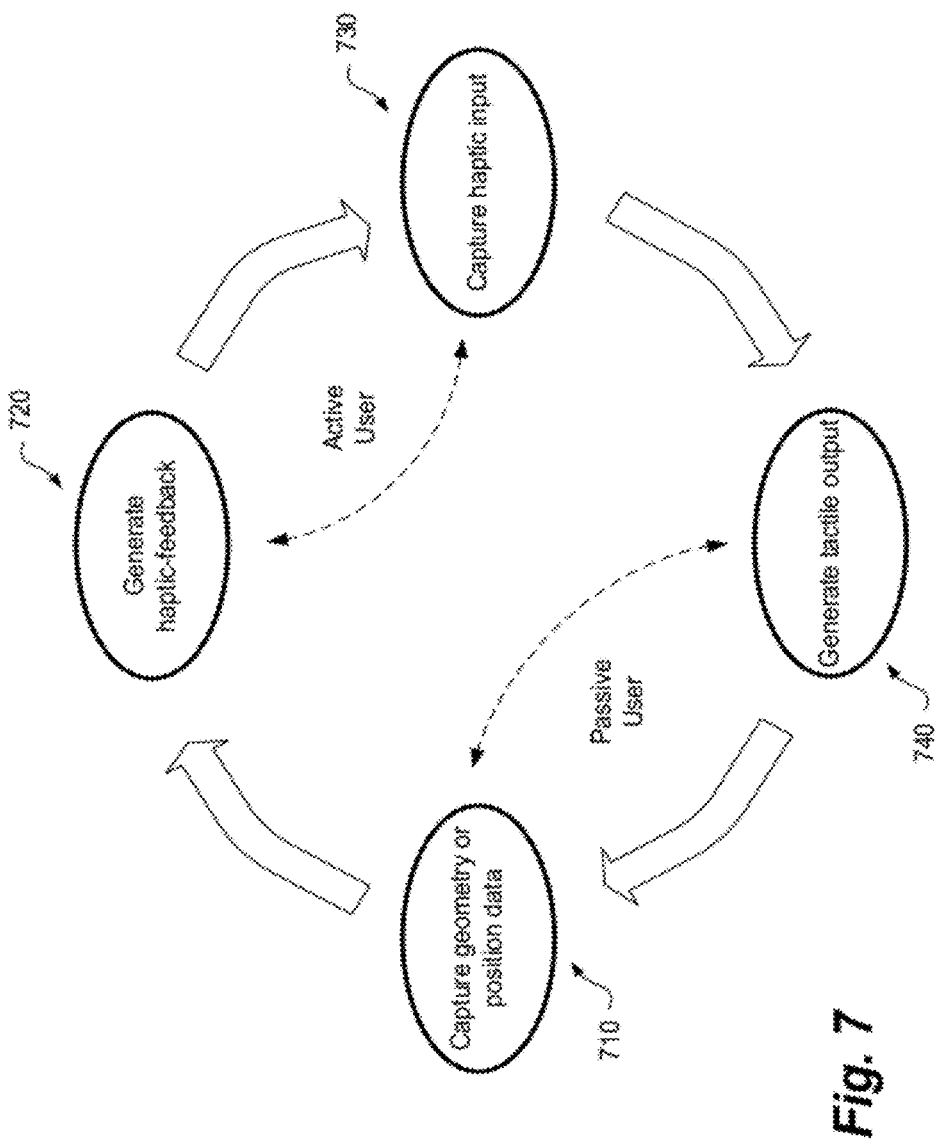
FIG. 7 shows a method for synchronous interpersonal haptic communication.

FIG. 7 presents a high-level method of synchronous interpersonal haptic communication system. From the passive user, position or geometry information generated from images captured at 710 by the imaging device coupled to the image capture device. The information is utilized to generate associated meta-data. The meta-data may be directly associated with, or encapsulated with, the video for video conferencing applications, or with position/geometry data when used in gaming or an avatar representation. This information is sent from the passive user through the network via the network managers. The active user device receives the information and generates haptic feedback 720 to a haptic input device based upon the information provided when contact is made with the representation of the passive user. The active user's input to the haptic input device, generated by movement of the device, is captured 730, and the appropriate tactile information is generated and sent to the passive user device when contact is made with the passive user representation. A tactile device translates the tactile information into a tactile result by actuating a tactile device such as actuators to simulate contact 740. The capture and generation process continues at 710. The active user can therefore interact with the passive user providing natural interaction between the participants.

Figure 8:
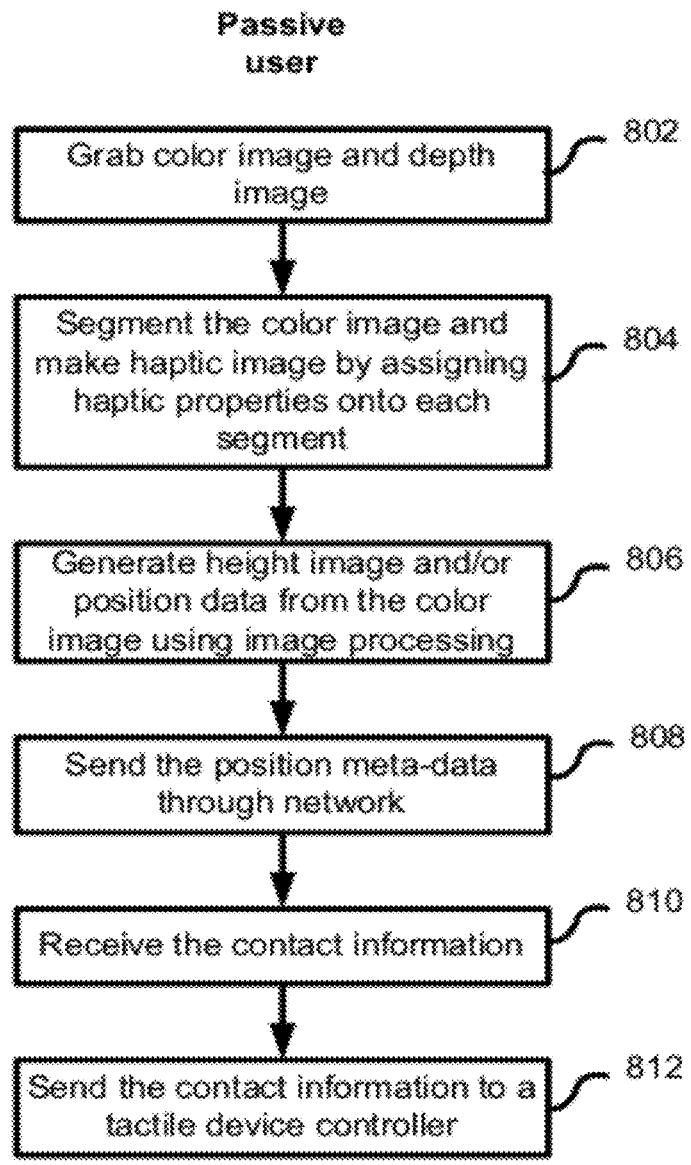
FIG. 8 shows a method for synchronous interpersonal haptic communication for a passive user.

FIG. 8 shows a method for synchronous interpersonal haptic communication from the passive user. A color image and depth image 802 are captured by an imaging device 434, 444 coupled to the image capture module 302. The color image is segmented and haptic image is generated by assigning haptic properties onto each segment 804. A height image is generated from the color image using image processing 806. The colour image may be utilized to generate position meta-data. The position meta-data, and the image (if required) is sent through network 380 from the passive user to the active user 808. The position meta-data can be provided to the active user for mapping to an image of the passive user or re-mapped to the avatar representation of the user. The active user system processes the received meta-data, as discussed in FIG. 9 and generates contact information. The contact information is received 810 and sent to a tactile device controller 812. The process can occur at a 15 to 60 Hz refresh rate to be synchronized with the video frame rate.

Figure 9:
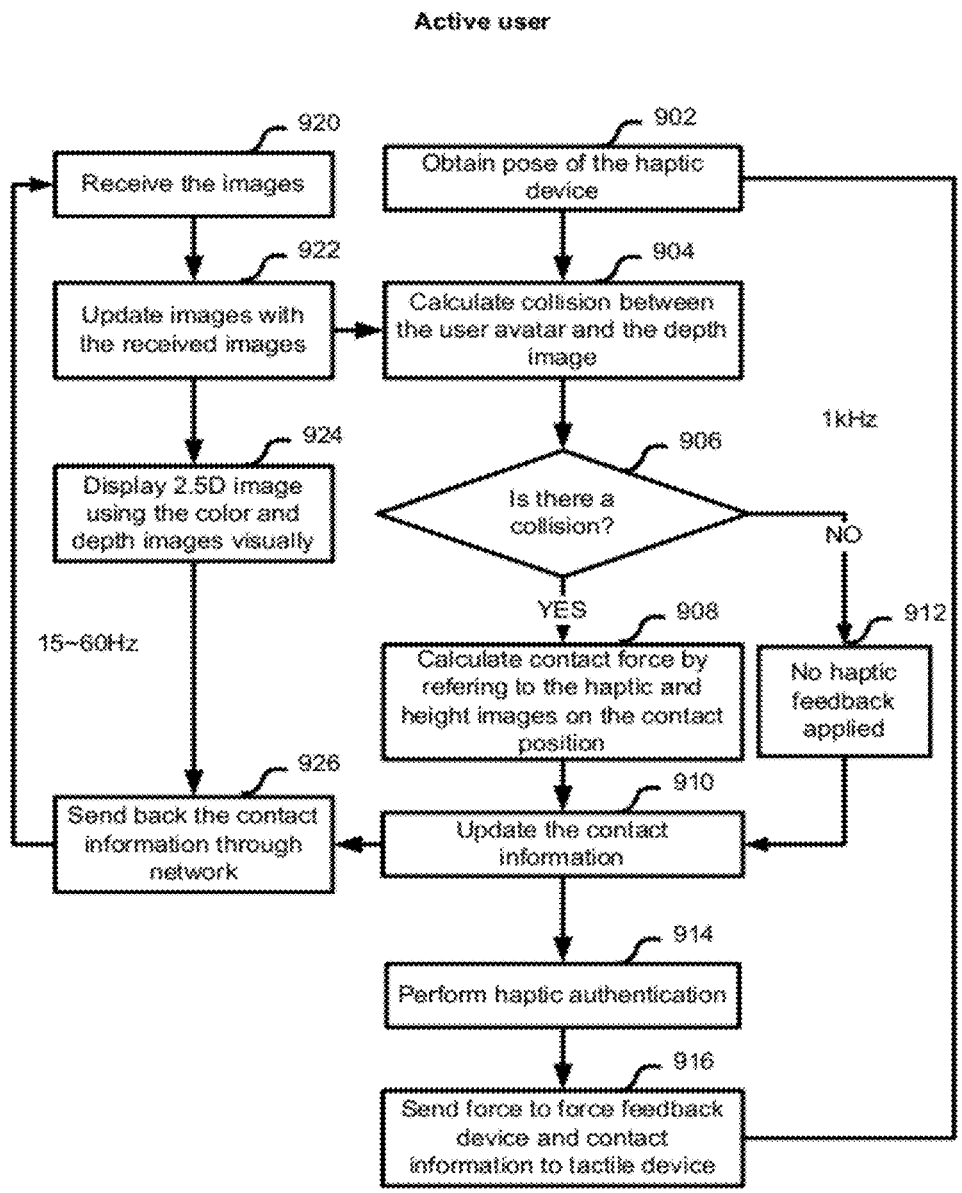
FIG. 9 shows a method for synchronous interpersonal haptic communication for an active user.

FIG. 9 shows a method for synchronous interpersonal haptic communication from the active user. Pose information is obtained from the haptic device 902, the pose information describes the position and orientation information of the haptic device. It is then determined if a collision between the user avatar, image or user representation and the depth image has occurred 904 by calculating interaction of the pose information and avatar, image or user representation. If a collision has not been detected, NO at 906, then no haptic feed-back is applied 912. If there is a collision between the haptic device input and the received avatar image, YES at 906, the contact information is calculated by referring to the haptic images on the contact position 908. The contact information between the active and passive users is updated 910. Haptic authentication is performed 914, as discussed in connection with FIG. 14. Based upon the calculated contact force, a force value is sent back to the force feedback haptic device and contact information is sent to the tactile device 916. This portion of the process occurs at a 1 kHz process to ensure stable feeling. At a lower refresh rate, 15 to 60 Hz, based upon the imaging frame rate, images are received 920 from the passive user, as described in FIG. 8. The images may be generated based upon geometry or position information or be streaming video images including depth information. The image is updated 922 and used to calculate collisions at 906. The image is displayed at 924 using the color and depth images or avatars visually on the display device. The contact information is sent back through the network 926 to the passive user based upon contact information received from 910. The process continues at 920.

Figure 10A:
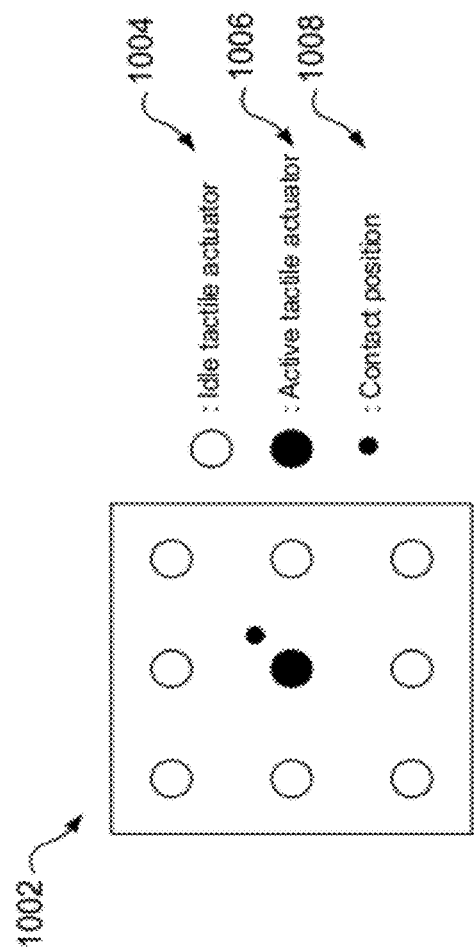
FIGS. 10a and 10b show a representation of tactile interaction using a plurality of actuators.

FIG. 10*a* shows a representation of tactile interaction using an array of actuators 1002. The tactile renderer converts the contact information into actuation signal sent to the tactile device. Tactile devices are usually composed of an array of actuators, such as vibrating motors, electrodes, piezo-ceramics, pneumatic tubes, voice coils, etc. The actuators may be arranged in a number of configurations based upon the physical positioning of the actuators on the user tactile device. The actuators can be arranged in a grid or array pattern based upon the garment. The actuators are attached separately on the human body because each actuator has its own volume and the human skin cannot discriminate between two closely located actuators well. If each actuator is regarded as a pixel in a visual display like a monitor, tactile devices have low resolution in general. Therefore, when the contact occurs at the position between tactile actuators, the simplest way to stimulate skin at a contact position 1006 is to activate the closest adjacent tactile actuators around the contact position However, when the contact position moves while keeping the contact like rubbing the skin, the resultant tactile feeling will be discrete.

Figure 10B:
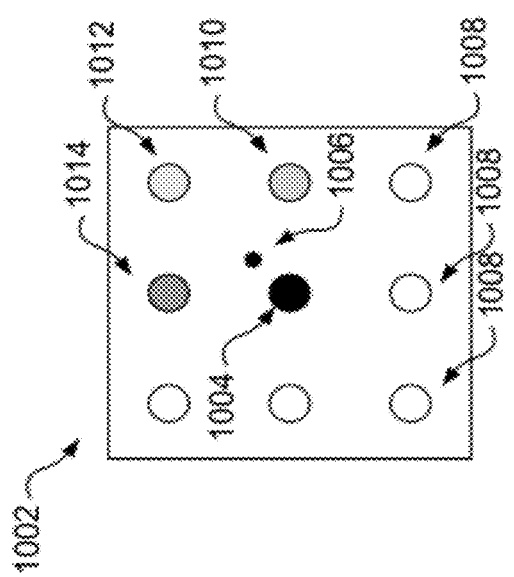

In order to make the tactile feeling smooth and continuous with the low resolution tactile device, a funneling illusion is utilized, as shown in FIG. 10*b*. For example actuators 1004, 1010, 1012 and 1014 would be activated at varying intensities to simulate the contact point. Idle actuators 1008 would be actuated at varying intensities as required as the contact position moves. FIG. 11 shows a representation of a funneling illusion for providing tactile output. Funneling is a human sensory illusion that generates a midway phantom sensation between two equal stimuli when they are presented simultaneously but separately at adjacent locations on the skin 1102. That is, as shown in FIG. 11*a*, where the ellipse illustrates the location of the stimulus and its size indicates the intensity. Two stimuli generated by actuators 1160 and 1170 are funneled into one midway sensation 1110 and the perceived intensity is summed with two intensities but not linearly. The location of the funneled sensation can be modified producing a sensation that moves along the skin between the two actuators. This can be done in two ways: adjusting the interstimulus time interval or adjusting intensities at the two stimuli (see FIG. 11*b*), which are caused by temporal inhibition and amplitude inhibition, respectively. Temporal inhibition occurs as the interstimulus interval increases between two stimuli of the same intensities, the perceived location moves towards the earlier stimulus. However, when the time interval goes over a certain threshold, the funneling illusion disappears and the two stimuli are felt separately. Amplitude inhibition occurs when the intensities of two stimuli are different as shown the funneled location moves towards the higher intensity stimulus 1112 and 1114.

Figure 12:
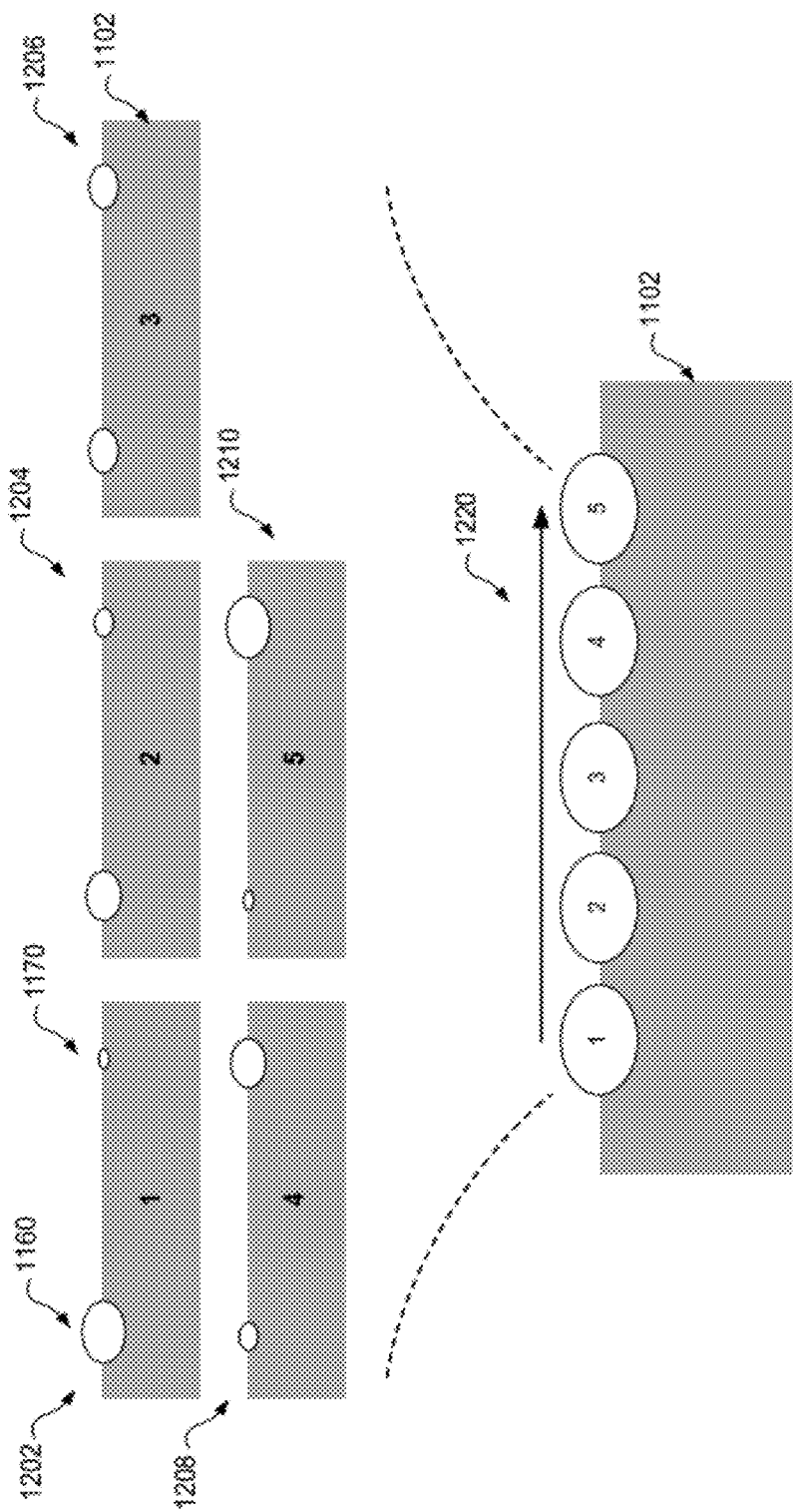
FIG. 12 shows a representation of simulating continuous moving sensation using the funneling illusion.

FIG. 12 shows a representation of simulating continuous moving sensation using the funneling illusion. Amplitude inhibition phenomenon to make the continuous sensation because it can produce a stronger funneling illusion than the temporal inhibition. The continuous sensation from one stimulus location to the other can be simulated by continuously changing two intensities 1160 and 1170 in the opposite way. That is, one stimulus intensity changes from small to large intensity while the other changes from large to small as illustrated in FIG. 12. Therefore, the resultant sensation moves from the left stimulus location to the right in FIG. 12 as shown in five increments, 1202, 1204, 1206, 1208 and 1210, the numbers, 1-5, associated with the order of stimulations. This feels as if the stimulus location moves continuously 1220 based on an apparent movement illusion with which, when two locations on human body are excited by two tactile stimuli with transient time delay, the user perceives an illusory sensation which continuously moves from the first location to the other.

Figure 13:
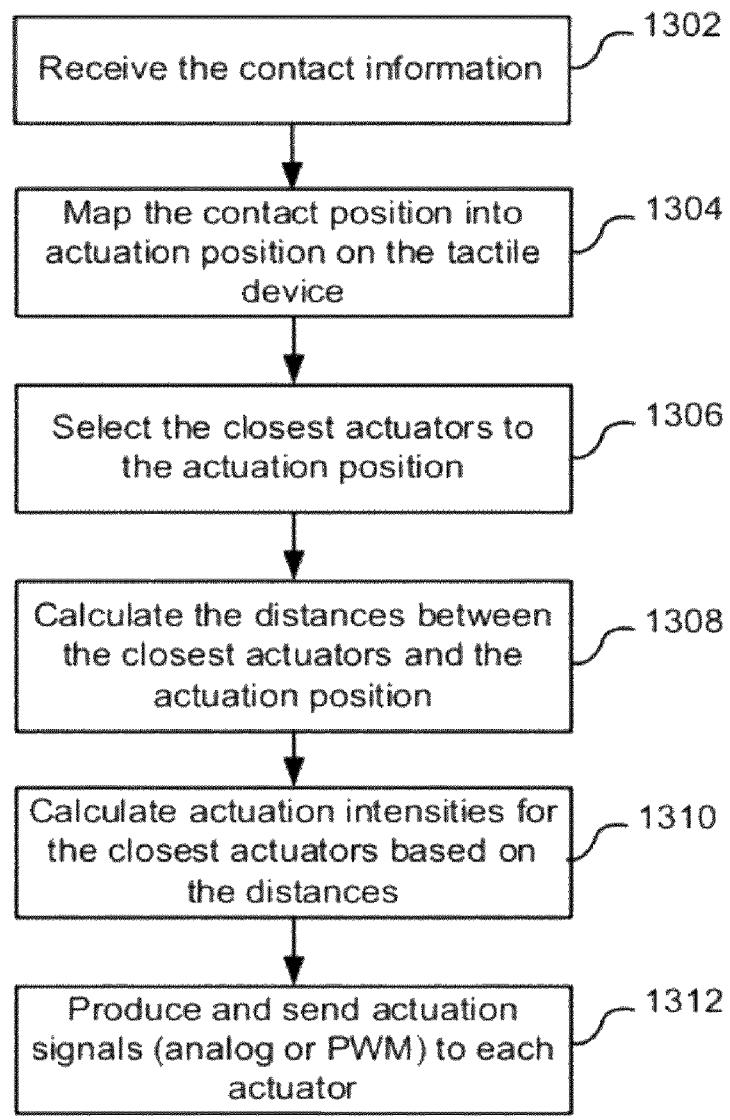
FIG. 13 shows a method for providing tactile interaction.

FIG. 13 shows a method for providing tactile interaction. The contact information is received 1302 by the network manager 312. The contact position is mapped 1304 into actuation position on the tactile device by tactile renderer 310. The mapping may be based upon visual position markers placed on the tactile device to provide references for actuation locations. The position location for actuation may also be wholly or partially calculated by the virtual space manager depending on the processing capability of the passive and active user systems depending on the contact data provided. The closest actuators to the actuation position 1306 is selected to simulate contact. The distances between the closest actuators and the actuation position 1308 is then calculated to simulate contact. The actuation intensities for the closest actuators are calculated based on the distances between the respective actuators 1310 and the actuation position. Each actuator is individual addressable and can be controlled by actuation signals that are produced and sent to each of the actuators 1312. The actuation current/voltage may be in analog or pulse width modulation (PWM) or any other proprietary format required to trigger actuators.

Figure 14:
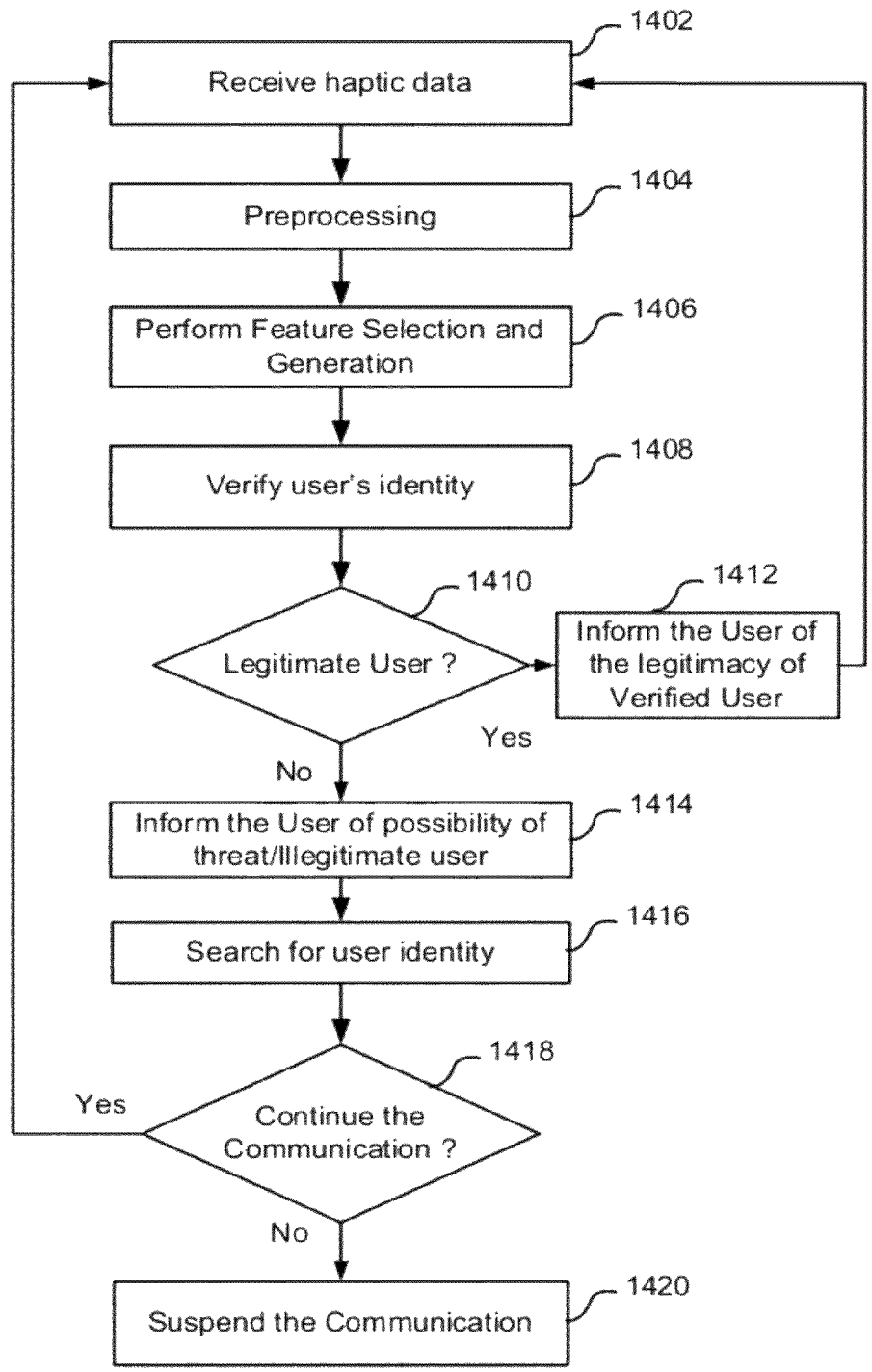
FIG. 14 shows a method for providing haptic authentication.

FIG. 14 shows a method for performing haptic authentication using haptic authentication module 328 or tactile authentication module 316. The method may be applied at the active and passive user devices or at a server as the same data may be available at both locations. The method ensures in real time that the other party who touches the user is the legitimate user. The user identity verification process is accomplished in a continuous manner. The user identity verification process is based on the user's profile in which a user pattern of movements and type of touches is observed and profile generated. The system learns the user behaviour using pattern recognition and machine learning techniques and stores the profiles either locally or on a server connected to the network. The module receives haptic data 1402, comprising movement of the haptic device and performs pre-processing of the data to obtain relevant vectors to determine a profile. Feature selection and generation is performed at 1406 to generate a signature for the received data. Pattern recognition and machine learning techniques are performed to verify the user's identity against a database of pre-determined identities. Each users identity can be characterized based on their interaction with the haptic device with the specific movement patterns being reproduced in each session. In the case of a legitimate user who touches the other party, YES at 1410, the other party, will be informed 1412 continuously that the touches is performed by the legitimate user. However, in case an illegitimate user touches the other party, NO at 1410, the other party will be informed 1414 that the touches are performed by an illegitimate user.

While the communication among parties continues, the user identity verification process carries on. If the user identity verification process determines that the touches are performed by illegitimate user, in addition to informing the user and the possibility of suspending the communication, the system performs user identity identification 1416 in order to potentially determine who the illegitimate user may be. A potential suspect can be reported back to the legitimate user to further pursue actions. In such case, the decision of suspending the communication or maintain communication is left to the end-user. If the user suspends communication, NO at 1418, the session or link will be terminated at 1420. If the user decides to maintain the session, YES at 1418 the method continues at 1402.

It will be apparent to persons skilled in the art that many alternatives, modifications, and variations can be made without departing from the scope as defined in the claims. The method described may be embodied in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

A computing environment for executing the interpersonal haptic communication may be implemented as computer software in the form of computer readable code executed. The computing environment may be any number of computing or computer based platforms such as mobile devices, personal computer, notebook computers, or personal digital assistants. The computer comprises central processing unit (CPU) and memory. The CPU may be a single processor or multiprocessor system. In various computing environments, main memory and storage can reside wholly on computer environment, or they may be distributed between multiple computers.

Input devices such as a keyboard, mouse and haptic devices may be coupled to a bi-directional system bus of a computer for receiving input for interacting within the communication system. The keyboard, mouse and haptic devices are for introducing user input to a computer, and output devices providing audio, visual, and haptic display capability in addition to tactile output through a tactile device, and communicating that user input to processor if required. Computer may also include a communication interface. Communication interface provides a two-way data communication coupling via a network link to a network by wired or wireless connection or may provide an interface to other host devices by a direct radio frequency connection. In any such implementation, communication interface sends and receives electrical, electromagnetic or optical means which carry digital data streams representing various types of information. Communication between the communication interface unit and the network or host, use electrical, electromagnetic or optical signals which carry digital data streams.

The computer processor or similar device may be programmed in the manner of method steps, or may be executed by an electronic system which is provided with means for executing these steps. The storage device may include both fixed and removable media, such as magnetic, optical or magnetic optical storage systems, Random Access Memory (RAM), Read Only Memory (ROM) or any other available mass storage technology. The storage device or media may be programmed to execute such methods. As well, electronic signals representing these method steps may also be transmitted via a communication network.

The embodiments described above are intended to be illustrative only. The scope of the disclosure is therefore intended to be limited solely by the scope of the appended claims.

The invention claimed is:

1. A method of synchronous haptic communications between an active user and a passive user through a network, the method comprising:
 capturing an image from an imaging device of the passive user and determining geometry or position data from the captured image by utilizing a depth component of the captured image;
 capturing haptic data from a haptic interface used by the active user based upon interaction with a generated image based on the captured image;
 generating tactile output to a tactile display associated with the passive user wherein the tactile output is based upon the haptic data in correlation with the geometry or position data to determine collisions therein; and
 generating haptic feedback to the haptic interface used by the active user based upon the haptic data in correlation with the geometry or position data to determine collisions therein is controlled/processed by a processor.

2. The method of claim 1 wherein the geometry or position data is transmitted through the network at a rate less than 60 Hz.

3. The method of claim 1 wherein the haptic data is represented in an RGB (Red, Green, Blue)-like pixel-based frames to describe the haptic properties associated with each pixel in the RGB frame wherein the haptic properties.

4. The method of claim 3 wherein the haptic properties are selected from stiffness, static friction, and dynamic friction.

5. The method of claim 1 wherein generating tactile output to the tactile display simulates touch by using a funneling illusion to a desired stimulus location by activating actuators in proximity of the desired stimulus location in the tactile display to provide a continuous sensation.

6. The method of claim 1 wherein the imaging device generates the depth image associated with the capture image of the passive user by using a 2.5-Dimensional or 3-Dimensional imaging.

7. The method of claim 1 further comprising determining a pose of the haptic device from the active user input to calculate if a collision has occurred with the captured image to generate an haptic feedback to the active user.

8. The method of claim 1 further comprising continuously performing active user identification and verification to determine in real time an identity of the active user.

9. An apparatus for synchronous haptic communications through a network, the apparatus comprising:
 a processor;
 a memory containing instructions for execution by the processor, the instructions comprising:
  capturing an image from an imaging device of the passive user and determining geometry or position data from the captured image by utilizing a depth component of the captured image;
  capturing haptic data from a haptic interface used by the active user based upon interaction with a generated image based on the captured image;
  generating tactile output to a tactile display associated with the passive user wherein the tactile output is based upon the haptic data in correlation with the geometry or position data to determine collisions therein; and
  generating haptic feedback to the haptic interface used by the active user based upon the haptic data in correlation with the geometry or position data to determine collisions therein.

10. The apparatus of claim 9 wherein the geometry or position is data is transmitted through the network at a rate less than 60 Hz.

11. The apparatus of claim 9 wherein the representation of the remote user is a computer generated avatar.

12. The apparatus of claim 9 wherein the tactile display is a device selected from a group comprising a tactile jacket, tactile vest, tactile glove, tactile suit and furniture incorporating addressable actuators.

13. The apparatus of claim 9 wherein the tactile device has visual indicators for determining positions of the actuators within the device, device location is determined based on the image of the passive user.

14. The apparatus of claim 9 further comprising an avatar database for providing an avatar representation of a user for display in a virtual environment.

15. A system for synchronous haptic communications between an active user and a passive user through a network, the system comprising:
   an image coding module for capturing images of the passive user and for generating a depth image to generate geometry or position data of the passive user;
   at least one network manager for facilitating networking and communication between the active user and passive user devices;
   a haptic render for converting a haptic position input and generating haptic feedback based on a haptic input device for receiving position input from the active user and providing haptic feedback to the active user;
   a tactile render for providing control commands to a tactile display for providing tactile output to the passive user based upon received contact data from the network manager;
   a video render for rendering an image or representation of the passive user to an video display to the active user; and
   a virtual space manager for processing geometry or position data of the passive user with haptic position input of the active user to generate the contact data, and provide the contact data to the tactile render and to the haptic render to simulate touch between the active user and passive user.

16. The system of claim 15 wherein the geometry or position is data is transmitted through the network at a rate less than 60 Hz.

17. The system of claim 15 further comprising an avatar repository for providing representation of one or more avatars to be utilized in place of an image of the user.

18. The system of claim 15 wherein the tactile display is a device selected from a group comprising a tactile jacket, tactile vest, tactile glove, tactile suit or furniture incorporating addressable actuators.

19. The system of claim 18 wherein the tactile rendered simulates touch by using a funneling illusion to a desired stimulus location by activating actuators in proximity of the desired stimulus location in the tactile device to provide a continuous sensation.

20. The system of claim 15 further comprising a haptic authentication module for continuously performing active user identification and verification to determine in real time an identity of the active user.

* * * * *